United States Patent [19]

Laakmann et al.

[11] Patent Number: 5,005,944
[45] Date of Patent: Apr. 9, 1991

[54] HOLLOW LIGHTPIPE AND LIGHTPIPE TIP USING A LOW REFRACTIVE INDEX INNER LAYER

[75] Inventors: Katherine D. Laakmann, Seattle; Michael B. Levy, Woodinville, both of Wash.

[73] Assignee: Luxar Corporation, Bothell, Wash.

[21] Appl. No.: 310,774

[22] Filed: Feb. 17, 1989

Related U.S. Application Data

[63] Continuation-in-part of Ser. No. 139,285, Dec. 29, 1987, Pat. No. 4,805,987.

[51] Int. Cl.$^5$ ............................................. G02B 6/20
[52] U.S. Cl. ................................................. 350/96.32
[58] Field of Search ............................... 350/96.32, 319

[56] References Cited

U.S. PATENT DOCUMENTS

| | | | |
|---|---|---|---|
| 3,382,087 | 5/1968 | Ostrowski | 350/319 |
| 3,436,141 | 4/1969 | Comte | 350/319 |
| 4,194,808 | 3/1980 | Marhic et al. | 350/96.32 |
| 4,592,353 | 5/1984 | Daikuzono | 128/303.1 |
| 4,652,083 | 3/1987 | Laakman | 350/96.32 |
| 4,662,368 | 6/1985 | Hussein et al. | 128/303.1 |
| 4,693,244 | 11/1986 | Daikuzono | 128/303.1 |
| 4,736,743 | 5/1986 | Daikuzono | 128/303.1 |
| 4,773,413 | 2/1987 | Hussein et al. | 128/303.1 |

*Primary Examiner*—William L. Sikes
*Assistant Examiner*—Robert E. Wise
*Attorney, Agent, or Firm*—Seed and Berry

[57] ABSTRACT

A hollow lightpipe for conducting high power levels of $CO_2$ laser light with low transmission losses. A highly reflective layer is formed on the inner surface of an elongated bendable metal housing. The material forming the highly reflective layer is chosen to have a complex index of refraction whose real part (n) is less than about 0.4. The thickness of the reflective layer need not be highly controlled, but must be sufficiently thick that it exhibits bulk absorption properties without being so thick that it cracks when the lightpipe is flexed. In a second embodiment, the transmission properties of the highly reflective layer can be enhanced by coating the reflective layer with a thin film of a dielectric material such as $ThF_4$ and Ge. By appropriate changes in the geometry of the lightpipe, it can also serve as a tip for use with an optical conduit, such as an optical fiber suitable for transmission of light produced by a YAG laser.

36 Claims, 7 Drawing Sheets

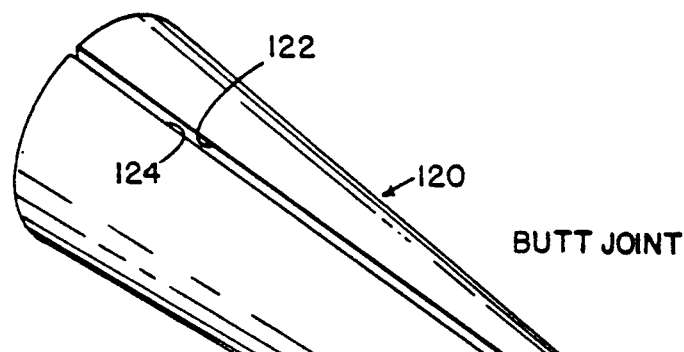
FIG.15  BUTT JOINT
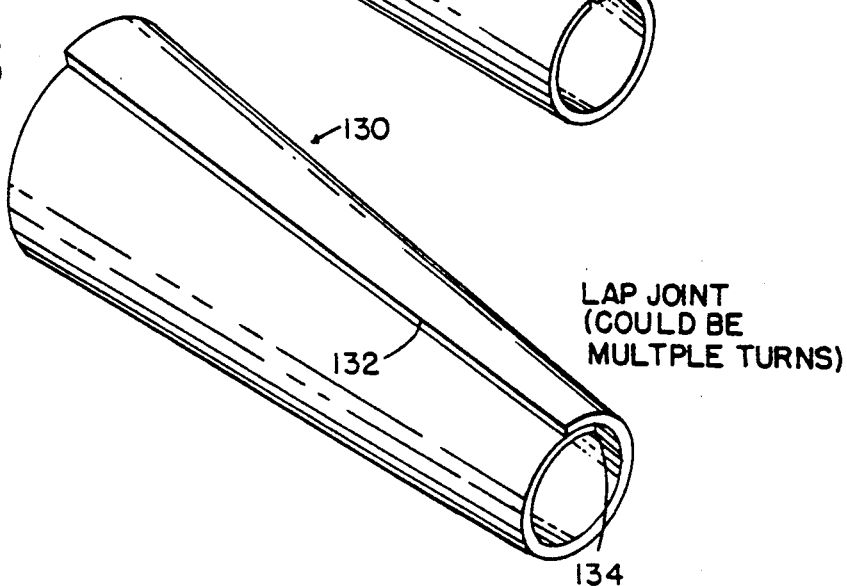
FIG.16  LAP JOINT (COULD BE MULTPLE TURNS)
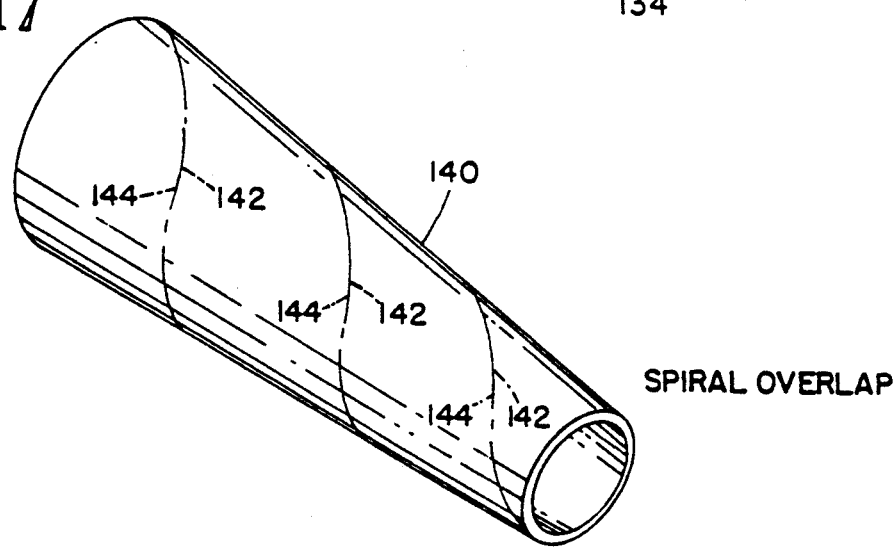
FIG.17  SPIRAL OVERLAP

HOLLOW LIGHTPIPE AND LIGHTPIPE TIP USING A LOW REFRACTIVE INDEX INNER LAYER

CROSS-REFERENCE TO RELATED APPLICATION

This application is a continuation-in-part of U.S. patent application Ser. No. 07/139,285, filed Dec. 29, 1987, now U.S. Pat. No. 4,805,987.

TECHNICAL FIELD

This invention relates to lightpipes and lightpipe tips, and more particularly, to hollow lightpipes and lightpipe tips having highly reflective inner surfaces.

BACKGROUND ART

For some time now, researchers have been attempting to develop an optical fiber or lightpipe for $CO_2$ laser wavelengths (i.e., 10.6 micrometers). The lightpipe should be flexible, have a transmissivity greater than 90 percent per meter, and be capable of transmitting power levels in excess of fifty watts. This flexible lightpipe, which can exceed one meter in length and have an inner diameter of about one millimeter, should also be easily manufactured, inexpensive, and non-toxic. Lightpipes having such properties are suitable for numerous military, scientific, medical, and industrial applications.

A variety of approaches to this development problem have been taken, some meeting with limited success. There are several existing solid-type lightpipes relying on total internal reflection, but none of these has yet reached commercial realization. The hollow waveguide described by Katherine D. Laakmann in U.S. Pat. No. 4,652,083 is available commercially, but suffers from limited flexibility and length. It is also difficult to manufacture because of the difficulty in depositing one or more thin film layers of precise thickness onto the interior wall of a long, narrow lightpipe.

It is therefore desirable to have a material whose refractive index is such that it will produce high light reflectivity from the internal surfaces of a hollow lightpipe of all polarizations of light over grazing angles of light incidence.

Presently available surgical yttrium aluminum garnet (YAG) lasers, having a wavelength of approximately 1.06 micrometers, are frequently attached to an optical fiber or other optical conduit for transmitting the YAG laser energy. The optical fiber is supplied with an artificial sapphire tip at its distal end to achieve a variety of effects, including (1) greater concentration of power to enhance incision, and (2) heating of the tip to achieve coagulation and cutting. However, artificial sapphire tips suffer from fragility and expense. It is therefore, desirable to utilize hollow tips for the reasons noted previously and to alleviate the shortcomings of the artificial sapphire tip and other present state of the art tips.

DISCLOSURE OF THE INVENTION

It is an object of the present invention to provide a material that is highly reflective to all polarizations of light where the range of incidence angles is between about eighty and ninety degrees.

It is another object of the present invention to provide a lightpipe that is highly transmissive to all polarizations of light at $CO_2$ laser wavelengths.

It is yet another object of the present invention to provide a lightpipe that is capable of transmitting high power levels.

Still another object of the present invention is to provide a bendable light pipe that is transmissive to light at $CO_2$ laser wavelengths.

A still further object of the present invention is to provide a hollow tip for an optical conduit with characteristics similar to the lightpipe of the present invention.

Yet another object of the present invention is to provide a method for manufacturing a hollow tip for use with an optical conduit.

According to one aspect, the present invention provides a waveguide for high efficiency transmission of laser light. The waveguide comprises an elongated housing having an interior surface defining an elongated interior space through which the laser light is transmitted and a reflective layer formed on the interior surface of the housing for reflecting the laser light incident thereon, the layer being composed of a material having a complex index of refractivity with a real part (n) less than about 0.4.

In another aspect, the invention provides a bendable waveguide for high efficiency transmission of laser light. The waveguide comprises an elongated bendable metal housing having an interior surface defining an elongated interior space through which the laser light is transmitted and a reflective layer of silicon carbide (SiC) formed on the interior surface of the housing, the layer having a thickness greater than about three micrometers.

In a further aspect, the invention provides a tip for high efficiency transmission of light energy from the end of a light conduit to an area exterior of the light conduit. The tip comprises an elongated tip housing having an interior surface defining an elongated interior space and a reflective area formed on the interior surface. The light energy from the light conduit is transmitted from an input end of the elongated tip housing through an output end of the tip housing to the area exterior of the light conduit. The elongated tip housing is adapted to be attached to the end of the light conduit. The reflective layer reflects the light energy from the conduit and is composed of a material having a complex index of refractivity with a real part (small n) less than about 0.4.

In still another aspect, the invention provides a method for manufacturing a tip for high efficiency transmission of light energy from the end of a light conduit to an area exterior of the light conduit. The method comprises the steps of (a) forming an elongated tip housing, (b) forming a reflective layer on an interior surface of the tip housing, and (c) adapting the elongated tip housing to be attached to the end of the light conduit. The elongated tip housing is formed to have an interior surface defining an elongated interior space between an input end and an output end. The reflective layer is formed on the interior surface of the tip housing and reflects the light energy incident thereon from the light conduit. The layer is composed of a material having a complex index of refractivity with a real part (n) less than about 0.4.

BRIEF DESCRIPTION OF THE DRAWINGS

FIG. 15 is an isometric view showing a fourth embodiment of the optical conduit tip of the present invention.

FIG. 16 is an isometric view showing a fifth embodiment of the optical conduit tip of the present invention.

FIG. 17 is an isometric view showing a sixth embodiment of the optical conduit tip of the present invention.

BEST MODES FOR CARRYING OUT THE INVENTION

Figure 1:
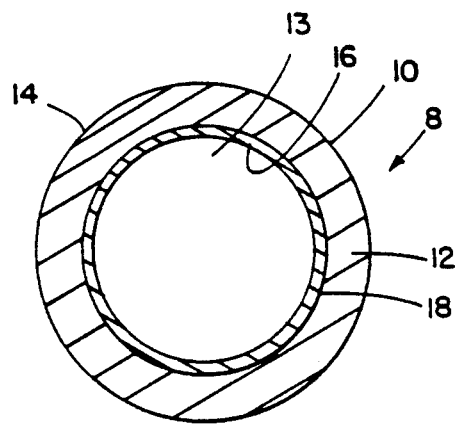
FIG. 1 is an enlarged axial cross-sectional view of a first embodiment of the lightpipe of the present invention.

The possibility of a hollow lightpipe using low refractive index materials for reflective surfaces has been noted by researchers in the past, but their understanding of the mechanism and, therefore, the requirements for the low index material was erroneous.

For example, in the Journal of Applied Physics, vol. 53, No. 8 (1982), Hidaka et al attempted to use a germanium dioxide ($GeO_2$) glass for the interior walls of a hollow lightpipe U.S. Pat. No. 4,453,803, to Hidaka et al, is based on this work. In the publication, a transmission of approximately 97.7 percent per meter (or a loss of 0.1 dB per meter) for a one millimeter internal diameter hollow lightpipe was predicted. Actual measurements, however, yielded a transmission of less than 25 percent per meter for a 0.6 millimeter bore. Even accounting for the difference in bore size between the theory and measurements, it is difficult to explain this discrepancy on the basis of measurement tolerances.

The predicted loss has been recomputed, based on the complex refractive index of the $GeO_2$ glass. The complex refractive index, as measured by Hidaka et al, was 0.6–i 0.1. The reflectivity at an 85 degree incidence angle is calculated to be approximately 95 percent, while at 88 degrees, it is 98 percent. The transmission was predicted to be approximately 31 percent, with the assumption of a modest radius of curvature of 100 centimeters. Unless particular effort is taken to keep a lightpipe straight, most hollow lightpipes will act as if they have a curvature of this magnitude. In addition, a transmission of less than ten percent per meter was predicted for a $GeO_2$ glass lightpipe with a radius of curvature of ten centimeters. Therefore, the hollow lightpipe as proposed by Hidaka et al is totally unsuitable because of poor transmission. Indeed, only if the inner surface of the lightpipe has a considerably lower index can it provide adequate transmission.

In the Journal of Applied Physics, Vol. 52, p.4467 (1981), Hidaka et al have also predicted the performance of a lightpipe using $PbO-SiO_2$ glass. We have predicted the poor results they reported in that publication, based on the refractive index of the material.

Other publications dealing with hollow glass lightpipes and alumina waveguides are "Experimental evaluation of a hollow glass fiber," Applied Optics, Vol. 25, No. 3, Feb. 1, 1986, by A. Bornstein and N. Croitoru and "Dispersion Phenomena in Hollow Alumina Waveguides," IEEE Journal of Quantum Electronics, Vol. QE-21, No. 10, Oct. 1985, by R. Jenkins and R. Devereux.

It seems more appropriate to define the problem as follows: What is the refractive index necessary to ensure that a beam suffers minimum reflection loss as it travels down a hollow lightpipe of finite curvature? Defined in this way, the problem becomes one of maximizing the reflectivity for the average of all polarizations for angles of incidence exceeding 80 degrees. The solution is a low index material as discussed below.

Only materials with a very low complex refractive index will be highly reflective at lightpipe grazing angles and $CO_2$ laser wavelengths. These materials can be defined as having a refractive index whose real part (n) is less than about 0.4. More specifically, if n is between about 0.4 and 0.15, the imaginary part (k) of the index of refraction should be less than about 1.5 and, if n is less than about 0.15, k should be either less than about 0.5 or greater than about 2.0. As can be seen from Table A, smaller values of n allow larger values of k for the same reflectivity.

TABLE A

| Reflection Loss at 81 Degrees | | | |
|---|---|---|---|
| n | k | Loss, S | Loss, P |
| 0.05 | −0.1 | 0.63 | 0.31 |
| 0.05 | −0.5 | 2.51 | 1.13 |
| 0.05 | −1.0 | 3.23 | 1.11 |
| 0.10 | −0.1 | 1.26 | 0.63 |
| 0.10 | −0.5 | 4.97 | 2.25 |
| 0.10 | −1.0 | 6.37 | 2.20 |
| 0.20 | −0.01 | 0.26 | 0.13 |
| 0.20 | −0.05 | 1.31 | 0.67 |
| 0.20 | −0.1 | 2.58 | 1.32 |
| 0.20 | −0.2 | 4.93 | 2.49 |
| 0.40 | −0.05 | 2.98 | 1.63 |

The applicants have also recognized that a section of hollow tube having a highly reflective inner surface can serve as a high efficiency hollow tip for use at the distal end of a YAG fiber or other light conduit. Such tips are less fragile than the artificial sapphire tips presently used with YAG fibers and are less expensive. Several metal are known to have low refractive indices at 1.06 micrometers. For example, silver has a refractive index of roughly 0.13–6.83j in thin film and 01.28–7.0j in bulk at 1.06 micrometers, while copper has an index of 0.2–7.0j in both bulk and thin film. The computed reflectivities of these materials are greater than 98% averaged for P and S polarization at an 81 degrees angle of incidence. The anticipated transmission for tips of these materials is generally greater than 90%, dependent upon the exact tip geometry and the input laser beam.

Referring to FIG. 1, a first, bendable, embodiment of a lightpipe 8 of the present invention can be seen to comprise an elongated tubular housing 10 with a circumferential sidewall 12 made from a flexible material defining an elongated hollow central opening 13. The sidewall 12 has an outer surface 14 and an inner surface 16. Preferably the flexible material is a metal, which can be chosen from the group comprising beryllium copper (BeCu), aluminum (Al), and stainless steels, although other flexible materials are also suitable. In one preferred embodiment of the invention, the inner surface 16 of the housing 10 is circular in cross-section. However, for specific applications, the cross-section of the inner surface 16 can be non-circular. The wall thickness of the sidewall 12 between the outer surface 14 and the inner surface 16 is chosen to provide adequate mechanical integrity and flexibility. The wall thickness is dependent upon both the material from which the sidewall 12 is made and the expected application of the lightpipe. The outer cross-sectional dimension of the housing 10 is typically in the range of 0.3 millimeters to 3.0 millimeters.

While, in some applications, it is desirable that the lightpipe be bendable, other applications may require that the lightpipe be rigid. A rigid lightpipe can be made according to the description above if the housing 10 is composed of an inflexible material. An example of such a lightpipe is one in which the housing 10 is made from a hollow rod of silicon carbide (SiC), the interior surface of the SiC rod serving as a highly reflective layer 18, as discussed below.

In general, the highly reflective layer 18 of material is formed on the housing inner surface 16. The reflective layer 18 can be the inner surface of the elongated tubular housing 10, which can be made from a single metal, such as copper or silver, or an alloy. Laser light that has been introduced into the housing central opening 13 reflects from the reflective layer 18 on the inner surface 16 at angles of incidence in the range of eighty to ninety degrees, as measured from a normal to the inner surface 16 (i.e., the grazing angle). The transmission efficiency of the light through the lightpipe is dependent upon the index of refraction of the material that composes the highly reflective layer 18. The index of refraction is a complex number whose real and imaginary components are dependent upon the wavelength and polarization of the incident light. The light polarization is determined by whether the electric field (E-field) vector is parallel to the light's plane of incidence (P-polarized) or perpendicular to the light's plane of incidence (S-polarized).

It has been determined that the highly reflective layer 18 is preferably made from a material having a low index of refractivity. The material in the highly reflective layer 18 should also be chosen for its flexibility, safety, and ease of manufacturing.

In one embodiment, the reflective layer 18 of the elongated housing 10 can be made from a layer of silicon carbide (SiC). SiC has an index of refractivity with $n=0.06$ and $k=1.12$ at an approximate wavelength of 10.6 micrometers. The computed reflectivity is greater than 98.9 percent for incident angles greater than 85 degrees for P and S polarizations averaged.

With perfectly smooth walls (i.e., no scattering due to wall roughness), the computed transmission, for a curved hollow lightpipe having the inner surface 16 with a 0.5 millimeter inner diameter and having a twenty centimeter radius of curvature, is greater than 90 percent per meter. The thickness of the SiC layer need only be sufficiently thick to provide bulk absorption properties without inhibiting flexibility. It has been found that a thickness of at least about three micrometers is more than adequate.

By comparison, as disclosed in the above-referenced prior art Laakmann patent, the complex index of refractivity used therein has an n that is greater than 1.0, a k that is vanishingly small (i.e., less than $10^{-3}$). Also, the thickness of the coating is a very precise fraction of the wavelength of light to be used (i.e., one-eighth of the wavelength). Because of the close tolerances required in the prior art Laakmann patent, lightpipes made according to the method disclosed therein will be more expensive than those made according to the present invention.

In general, the highly reflective layer 18 of the present invention should have a complex index of refraction with a real part that is relatively small and a thickness that is unimportant as long as it is thick enough to assure that the reflective layer 18 has bulk absorption properties.

Figure 2:
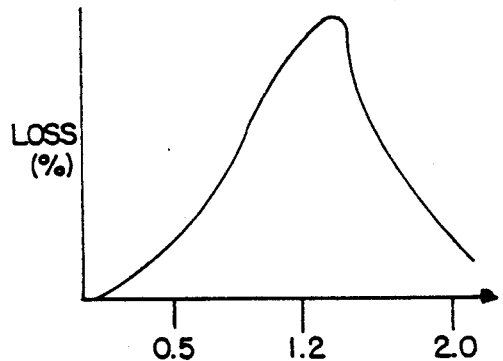
FIG. 2 is a graph of lightpipe transmission loss as a function of the imaginary component of the complex index of refraction, for the lightpipe of FIG. 1.

It has been found that, for values of n which are sufficiently low, acceptably low losses are obtained when the imaginary part of the index of refraction has a value outside of a specific range. As shown in the graph of FIG. 2, for values of k of less than approximately 0.2 and for a fixed angle of incidence, transmission loss is maximum when the imaginary component has a value of approximately 1.2. In order to keep the transmission loss acceptably low, therefore, it is desirable to maintain k with a value that is less than approximately 0.5 or greater than approximately 2.0.

Figure 3:
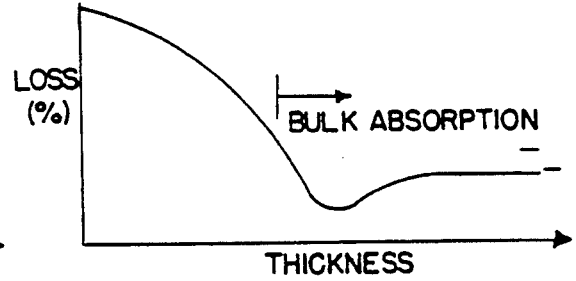
FIG. 3 is a graph of lightpipe transmission loss as a function of thickness of the layer of reflective material formed on the inner surface of the lightpipe, for the lightpipe of FIG. 1.

The graph in FIG. 3 shows the effect of the thickness of the reflective layer 18 on transmission loss for a fixed angle of incidence and a fixed laser light wavelength, when the reflective layer 18 is made from SiC. It can be seen that as the thickness of the reflective layer 18 increases to the point where the material begins to exhibit bulk absorption properties, the transmission loss decreases to a minimum value, beyond which it increases only slightly to a constant value. Therefore, transmission loss can be held at nearly its minimum value by assuring that the thickness of the reflective layer 18 exceeds that required to give bulk absorption properties. A usable upper limit on the thickness of the reflective layer 18 is that thickness at which the layer cracks when the lightpipe is bent to its minimum expected radius of curvature.

In addition to making a hollow lightpipe whose highly reflective layer 18 has the proper reflectivity properties, it is important that the lightpipe be easily manufactured. The lightpipe shown in FIG. 1 can be made in several ways. In a first method, the reflective layer 18 can be formed initially over a mandrel and metal elongated housing 10 subsequently formed over the reflective layer 10 by sputtering or chemical vapor deposition (CVD), among other techniques. The mandrel should have an outer diameter approximately equal to the desired inner diameter of the waveguide to be produced.

The housing 10 can be sputtered on the reflective layer 18 by creating ionized particles of the material from which the housing 10 is made and causing the reflective layer 18 to have an electrical potential which attracts the ionized particles. Sputtering produces the housing 10 with a substantially uniform thickness.

In CVD, the mandrel covered by the reflective layer 18 is placed in an enclosure containing a vaporized atmosphere of the reflective material desired for the housing 10. All surfaces of the reflective layer 18 will be coated with the desired material for housing 10 in a substantially uniform layer. In this method, the mandrel, which may be made from silicon, molybdenum, tungsten, or graphite, for example, can then be dissolved, leaving the waveguide consisting of the reflective layer 18 on the inner surface of the housing 10. This method may be particularly suitable for forming the rigid embodiment of the lightpipe of the present invention, especially one composed of a single material.

In a second method, the reflective layer 18 can be formed on the inner surface 16 of the housing 10 by either sputtering or CVD techniques, as described above.

In a third method, the lightpipe can be formed by placing the highly reflective layer 18 on a flat sheet (not shown) of the material which will be formed into the tubular housing 10. After a reflective layer 18 of adequate thickness has been formed, the sheet of the housing material is rolled into a small dimension tube so that the reflective layer 18 is interior of the inner surface 16 of the housing 10. A difficulty with this method is that the reflective layer 18 will have to have a relatively high tolerance to bending so that it will not crack when the housing 10 is rolled to form the tube.

An extension of this concept is to enhance the reflectivity of the low index reflective inner surface 16 by dielectrically overcoating it. At suitable thicknesses, a dielectric overlayer can be used to protect the metal from oxidizing. For example, a layer of $SiO_2$ of less than 500 angstroms would serve as a suitable protecting layer and not significantly change the transmission efficiency of the reflective layer. On the other hand, a 1200 angstrom layer of $SiO_2$ improves the reflectivity from 98% to 99.3%.

Figure 4:
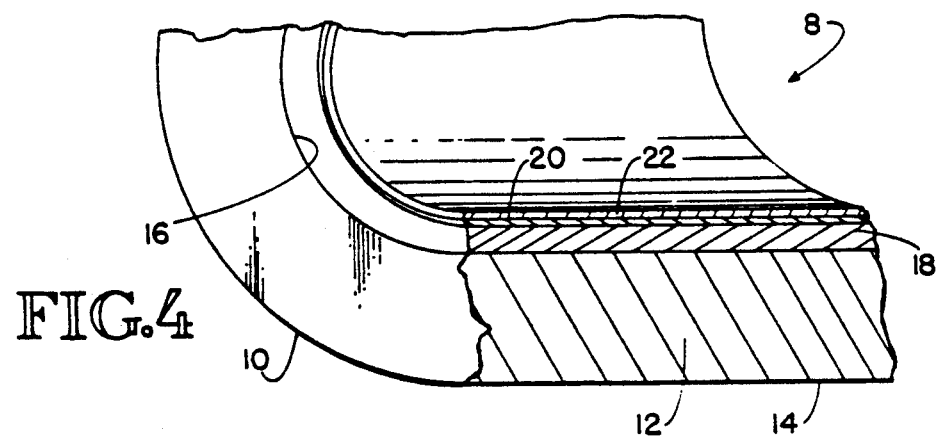
FIG. 4 is a close-up cutaway view of a portion of the wall of a second embodiment of the lightpipe of the present invention.

Referring to the close-up cutaway view of FIG. 4, for example, a first overcoat 20 of 1.51 micrometers of $ThF_4$ is applied and then a second overcoat 22 of 0.9 micrometers of Ge is applied to enhance the reflectivity of the inner surface 16. However, a drawback of enhancement coatings is the requirement to use precision thin film deposition. This approach would be desirable if sufficiently low refractive materials could not be obtained, but low loss (i.e., low k value) dielectric coatings were available.

Figure 5:
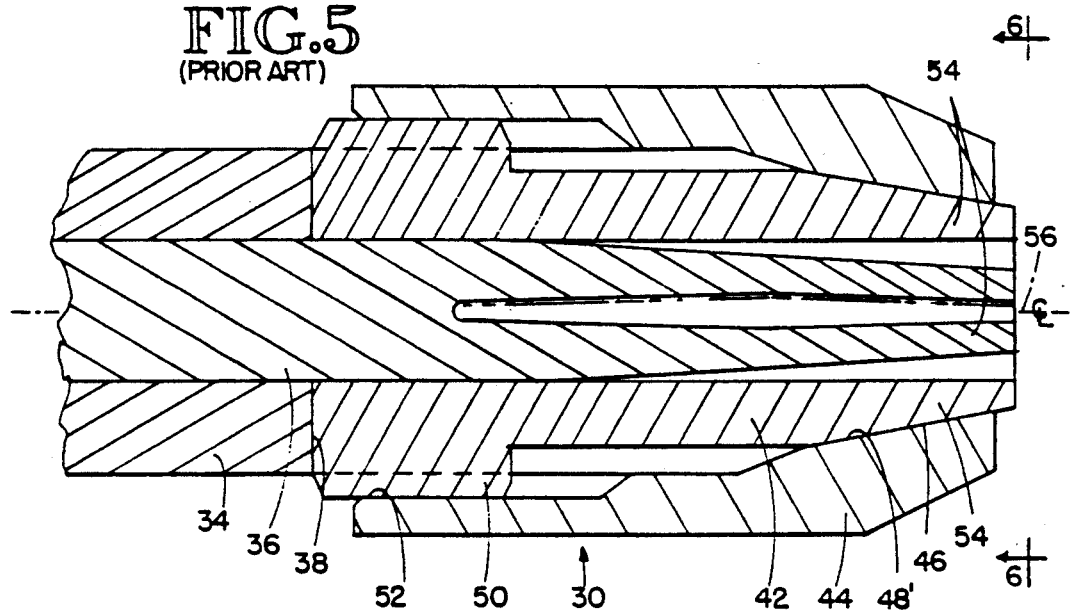
FIG. 5 is a longitudinal cross-sectional view of the termination of an optical conduit known in the prior art.

FIG. 5 is a longitudinal cross-sectional view of a fitting 30 attached to an optical conduit 32 of conventional design. The fitting 30 is attached to the end of the optical conduit 32, which includes an outer sheath 34 concentric with a light conductor 36, which may take the form of an optical fiber or a hollow optical waveguide such as described above. If the light conductor 36 is an optical fiber adapted, for example, to conduct the wavelengths of light produced by a YAG laser, the light conductor 36 will extend beyond an output end 38 of the outer sheath 34, such as shown in FIG. 5.

The fitting 30 includes a collet chuck 42 and a clamping nut 44. The collet chuck has a tapering outer surface 46 which mates with a tapering inner surface 48 on the collet chuck. The collet chuck 42 and the clamping nut 44 also each respectively include corresponding threads 50 and 52 which permit the clamping nut 44 to be screwed onto the collet chuck 42.

Figure 6:
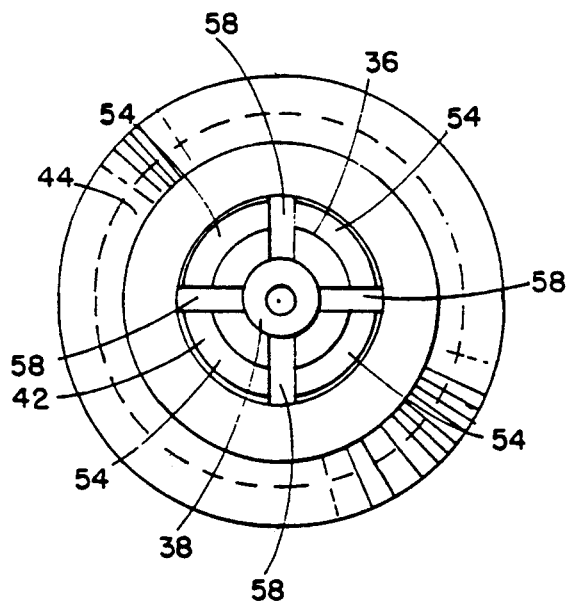
FIG. 6 is a transverse cross-sectional view of a termination of an optical conduit known in the prior art, as shown along lines 6—6 of FIG. 5.

As the clamping nut 44 is screwed onto the collet chuck 42, the two mating tapering surfaces 46 and 48 engage, causing a plurality of fingers 54 of the collet chuck 42 to move radially inward toward a longitudinal center line 56. The tips known in the prior art can be attached to the end of the optical conduit 32 by means of the fitting 30. This is accomplished by placing the tip into the collet chuck 42 before the clamping nut 44 is tightened against the collet chuck. In a conventional construction of the fitting 30, the fingers 54 of the collet chuck 42 will have spaces 58 therebetween, as best shown in the transverse cross sectional view of FIG. 6. If desired, the tip can include ears, as will be discussed subsequently, which are received in the spaces 58 of the collet chuck 42. As the clamping nut 44 is tightened against the collet chuck 42, the fingers 54 move radially inward toward one another sufficiently to grip the tip and prevent it from disengaging from the fitting 30.

The prior art includes the medical and surgical laser probes disclosed in U.S. Pat. Nos. 4,592,353, 4,693,244, and 4,736,743, to Norio Daikuzono. In various embodiments, these patents disclose lights conduit tips made from a light transmissive material such as sapphire. These tips have the capability of controllably transmitting laser energy longitudinally through its distal end or transversely through its side. In addition, these tips can include a thin layer of infrared absorbing material such as manganese dioxide ($MnO_2$), which can receive optical energy transmitted through the side of the tip and transform this energy to thermal energy. The side of the tip, which can be heated to about 700° C., accordingly carbonizes any tissue it contacts. The remainder of the laser energy passes directly to the tissue, where it enhances the vaporization of the carbonized tissue. Noncontact laser systems utilizing a laser transmissive member at the output end of a fiber to focus or otherwise alter the radiation characteristics of the fiber have also been proposed, for example, by Enderly, in U.S. Pat. No. 4,273,109.

The tips of the present invention are compatible with the conventional fitting 30, as described above. If the optical conduit is a hollow lightpipe, those skilled in the art will appreciate that the fitting 30 can be adapted to attach thereto and hold a tip in place The tip of the present invention, however, while offering capability of both transmitting optical energy longitudinally through its distal end (into a conical distribution) and transforming some light energy into thermal energy for the purpose of carbonizing tissue, do so by transforming the thermal energy by means of the composition of an internal surface of the tip. The composition of the internal surface can be established by making the tip from an appropriate material (such as an alloy) or by applying a coating as described above. The tips are, accordingly, more durable, since the inner surface, which converts the laser energy into thermal energy, is more protected than the outside surface of a fragile light transmissive material.

As will be described below, both the amount of thermal energy distributed by the tip and the thermal profile along the tip can be controlled by the efficiency of conversion of light energy to thermal energy, the thermal characteristics of the material of which the tip is composed, and the contact between the tip and a thermal dissipation means such as an outer sheath. The optimum transmissivity, optimum temperature profile of the exterior of the tip, and optimum thermal time constant of the exterior of the tip will vary depending upon the exact clinical application for which the tip is intended. With some applications, it may be desirable to have just the most distal portions of the tip heat up, while with other applications, a longer portion of the tip should be heated. Included among the advantages of this invention over the prior art are that the heating profile, the thermal time constant, and the ultimate temperature of the tip can be readily tailored to a particular application.

Figure 7:
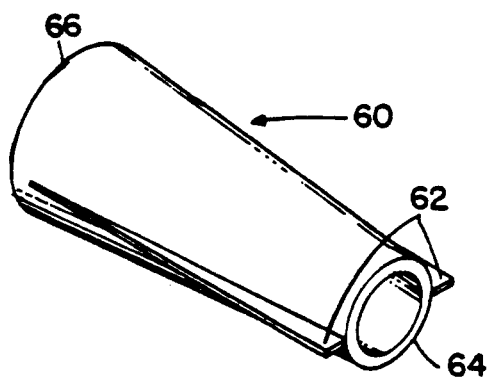
FIG. 7 is an isometric view of a first embodiment of the optical conduit tip of the present invention.

FIG. 7 is an isometric view of a first embodiment of an optical conduit tip 60 of the present invention. The tip 60 can be formed from a short length 82 (shown in FIG. 9) of an optical lightpipe manufactured as described above. The short length of the optical lightpipe can be cut from a longer length of the optical lightpipe. It can then be modified as desired to create the optical tip 60. As shown, this first embodiment of the tip 60 includes -a pair of ears 62 which are diametrically opposed with respect to the longitudinal axis of the tip 60 and which extend from a narrower end 64 of the tip 60 toward, but terminate before reaching, a broader end 66. In a second embodiment of the ears 98 which extend completely from a narrow end 94 to a broad end 96 of the tip. As noted above, the ears 62 may be sized to be received in the spaces 58 of the collet chuck 42 (see FIG. 6) being utilized.

Figure 8A:
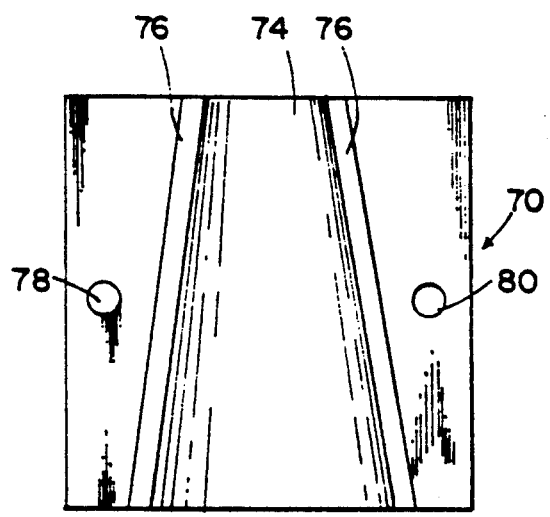
FIG. 8A is a top view of a jig used to make the optical conduit tip of FIG. 7.
Figure 8B:
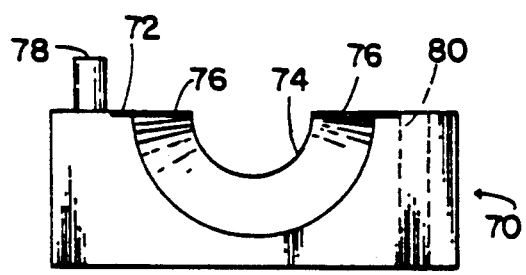
FIG. 8B is an elevational end view of the jig of FIG. 8A.

FIGS. 8A and 8B are top and elevational end views, respectively, of one of two identical fixtures 70 which form the jig used to make the optical conduit tip 60 of FIG. 7. The fixture 70 includes a flat surface 72, in which is formed half of a conical depression 74, and two smaller shallow depressions 76 extending alongside of the conical depression 74. The fixture 70 also includes an alignment peg 78 and hole 80 which allow the two fixtures 70 to be properly registered with respect to one another when assembled to form the optical conduit tip 60.

Figure 9:
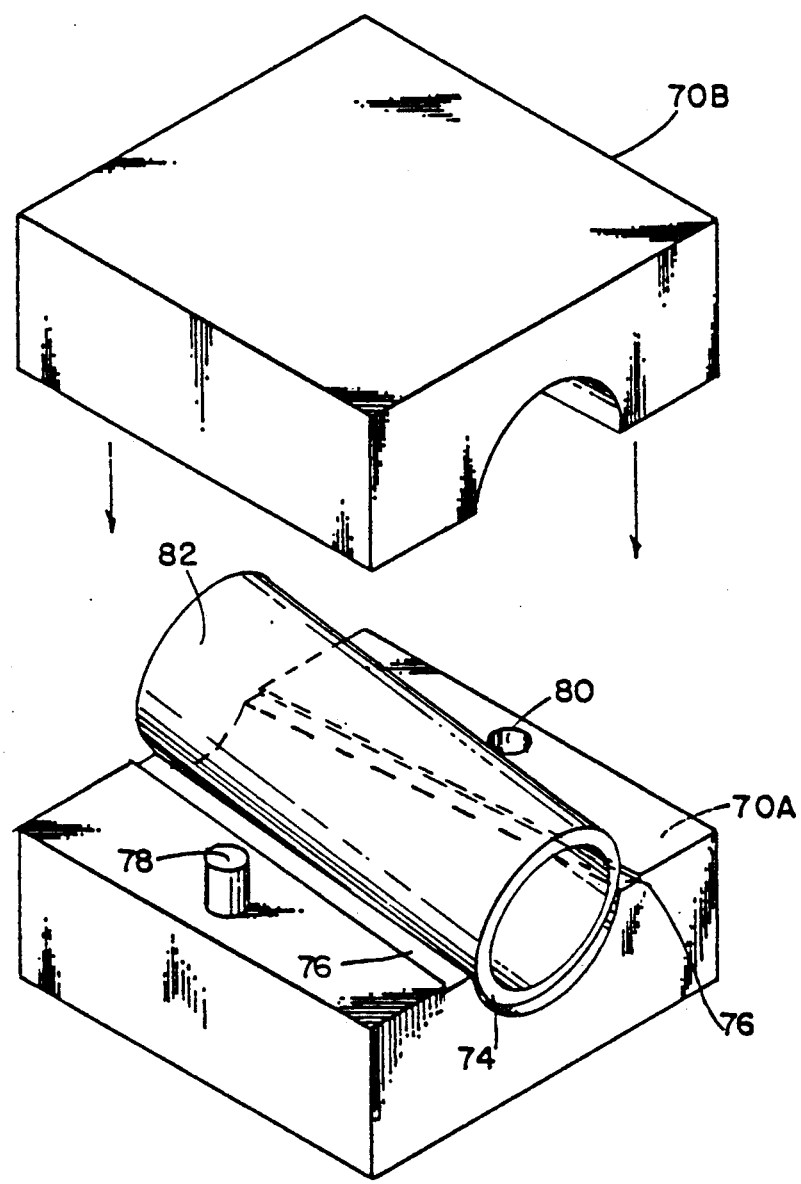
FIG. 9 is an isometric view showing a step in the method of manufacturing the optical conduit tip of FIG. 7.

The tip 60 shown in FIG. 7 can be formed in a jig comprised of two fixtures 70 of the type depicted in FIGS. 8A and 8B and as shown in FIG. 9 as first and second fixtures 70A and 70B. A short length 82 of the optical lightpipe described above is placed in the fixture 70A, resting in the conical depression 74. The second fixture 70B is brought into registration with the first fixture 70A by means of the peg 78 and hole 80, which mate with a corresponding hole and peg, respectively, of the second fixture 70B. After the pegs and holes are engaged, the two fixtures 70A and 70B are pressed together, bending the short length 82 of the optical lightpipe until it forms the tapered tip 60 shown in FIG. 7. The material of the short length 82 along the narrower lengthwise portion of the conical depression 74 bends outward and into the shallow depressions 76 to form the ears 62.

Figure 10:
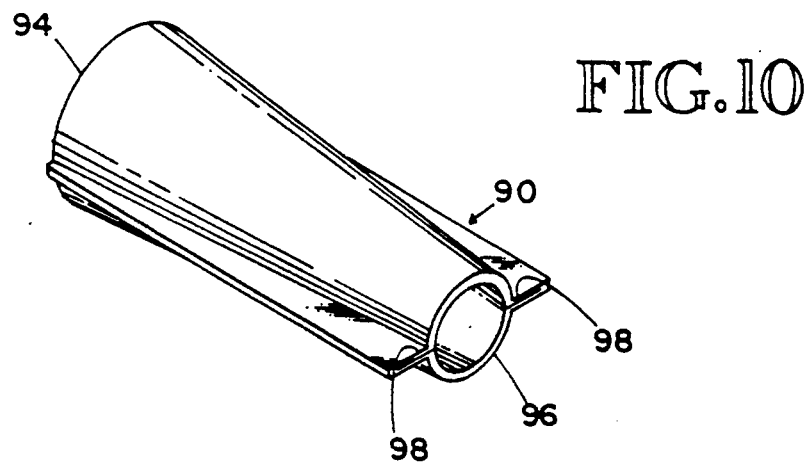
FIG. 10 is an isometric view of a second embodiment of the optical conduit tip of the present invention.
Figure 11:
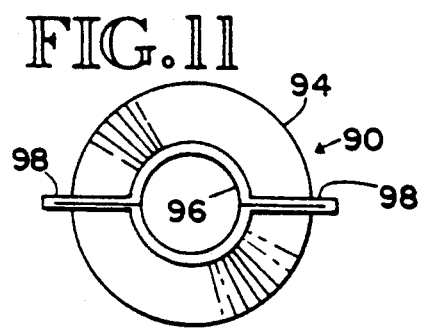
FIG. 11 is an end view of the optical conduit tip of FIG. 10.

FIG. 10 is an isometric view of the optical conduit tip according to a second embodiment of the present invention. In the second embodiment, the tip 90 includes a lengthwise tapering body portion 92 which tapers from a large input end 94 to a narrow output end 96. The tip 90, also shown in an end view in FIG. 11, includes a pair of diametrically opposed ears 98 which extend between the large end 94 and the narrow end 96.

Figure 12:
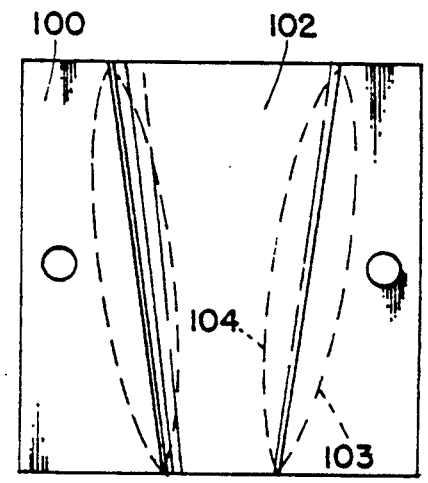
FIG. 12 is a top view of a jig used to make the optical conduit tip of FIG. 10.

It should be noted that it is not necessary that the tip be frustoconical in shape. As shown in FIG. 12, which is a top view of a jig fixture 100 used in the method of making the optical tip 90 shown in FIG. 10, a depression 102 can be shaped to define any desired tapering shape and form any desired shape of diametrically opposed ears 98 by alternatively enlarging or reducing the width of the depression along its length, such as shown by dashed lines 103 and 104.

Figure 13:
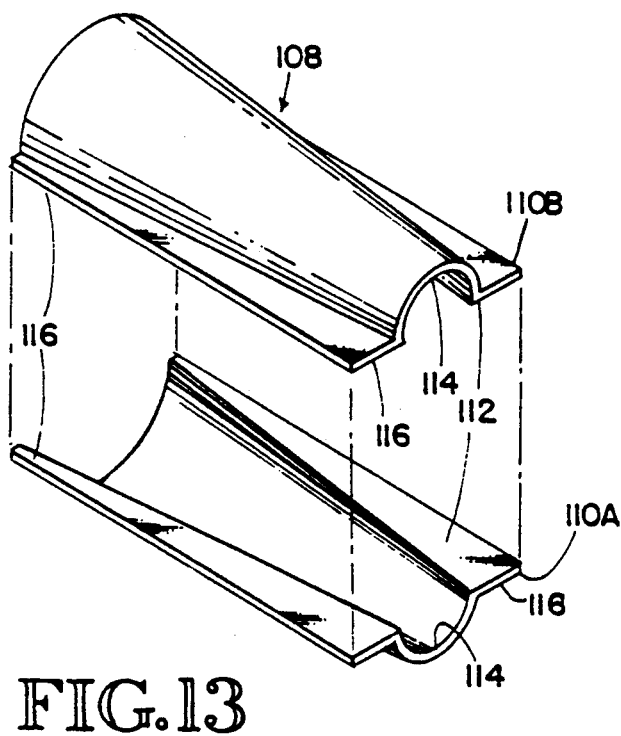
FIG. 13 is an isometric view showing a step in the method of manufacturing a third embodiment of the optical conduit tip of the present invention.
Figure 14:
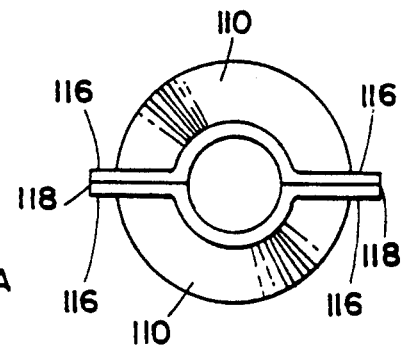
FIG. 14 is an end view of the third embodiment of the optical conduit tip after it has been fully manufactured.

FIG. 13 is an isometric view showing a step in the method of manufacturing an optical conduit tip 108 according to a third embodiment of the present invention. The conduit tip 108 in this embodiment is formed from two identical halves 110A and 110B made from a foil of material having a reflective layer formed on each of the inner surfaces 112 of the halves. The inner surfaces 112 are shaped to include a tapered depression 114 and two opposed co-planar ear portions 116. The tip 108 formed from the tip halves 110 by placing the two tip halves into registration with the tapered depressions 114 aligned with each other, and permanently attaching the corresponding ear portions 116 of the two halves together FIG. 14 is an end view of the assembled tip 108, formed by welding the corresponding ear portions 116 together along their common outer joint edges 118. Other means of attaching the two tip halves 110A and 110B together can also be used.

FIG. 15 is an isometric view of optical conduit tip 120 according to a fourth embodiment of the present invention. The optical tip 120 can be formed from a planar sheet of material having one surface which has been coated with an appropriate reflective layer as described above. Opposite edges 122 and 124 of the sheet can be cut and the sheet rolled/bent to place the edges 122 and 124 in abutment and form the optical tip 120. If desired, the butt joint formed between the edges 122 and 126 can be welded, or otherwise attached to each other. Alternatively, the optical tip 120 can be placed in an outer sheath such as shown in FIG. 18 for another embodiment of the invention in order to hold the edges 122 and 124 in position adjacent to one another.

FIG. 16 is an isometric view of an optical conduit tip 130 according to a fifth embodiment of the present invention. The optical tip 130 can be formed from a planar sheet of material having an appropriate reflective layer coated on one surface thereof, as described above. In this embodiment, the sheet is rolled to place the two opposite edges 132 and 134 of the sheet in an overlapping position and form an lap joint with the inner surface of the resulting optical tip 130 entirely coated with the reflective layer. If it is desired, for example, to increase the stiffness of the optical tip 130, the sheet can be wrapped around several times to form a lap joint with several layers of the coated sheet.

FIG. 17 is an isometric view of an optical conduit tip 140 according to a sixth embodiment of the present invention. The optical conduit tip 140 can be formed created by cutting a strip having two parallel edges 142 and 144 from a sheet of material that has been coated to have an appropriate reflective layer. When the strip is rolled in a spiral with the edges 142 and 144 in abutment, a conical shape will result. The adjacent edges 142 and 144 can be affixed in any desirable manner, such as welding, to retain the shape of the tip 140.

Figure 18:
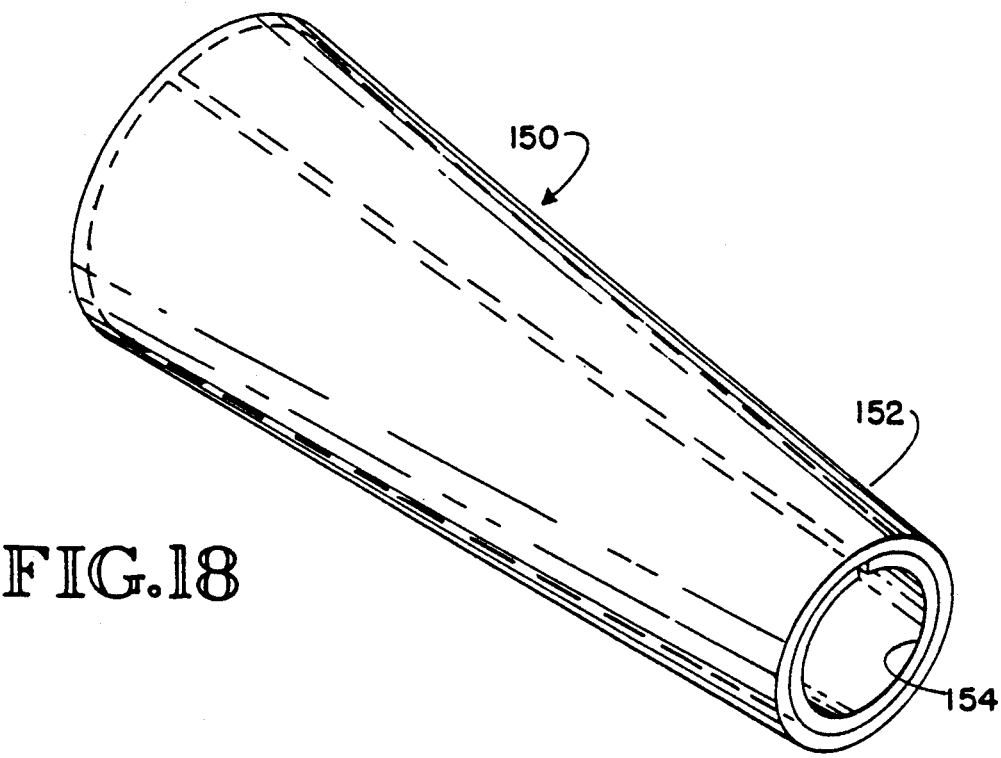
FIG. 18 is an isometric view showing a seventh embodiment of the optical conduit tip of the present invention.

As previously noted, FIG. 18 is an isometric view of an optical conduit tip 150 according to a seventh embodiment of the present invention. The optical tip 150 has an outer sleeve or sheath 152 and an inner tip portion 154. The inner tip portion 154 can be a butt joint tip, such as the optical tip 120 shown in FIG. 15, and the outer sheath 152 can have a correspondingly shaped and sized conical section to fit snugly around the inner tip portion 154 and hold the inner tip portion in the desired shape and protect it. The outer sheath 152 can serve as a thermal sink to control the temperature of the tip, for example, to prevent the optical tip 150 from becoming overheated. Both the material of the outer sheath 152 and the nature of its contact to the optical tip 150 can be varied to obtain a desired temperature profile along tip. For example, ensuring good thermal contact between the optical tip 150 and the outer sheath 152 at the distal end of the optical tip 150 will cause the distal end of the outer sheath 152 to reach higher temperatures than the proximal portions of the outer sheath 152. Lengthening the longitudinal dimension of the thermal contact between the optical tip 150 and the outer sheath 152 will lengthen the longitudinal dimension of the heated portion of the outer sheath 152. The efficiency of combined optical tip 150 and outer sheath 152 will be determined by physical properties of the tip and the sheath, including thermal conductivity of the materials used and transverse thicknesses of the optical tip 150 and the outer sheath 152. If desired, the thickness of the outer sheath 152 can be varied to obtain a specific longitudinal temperature profile Also, the properties of the materials and the thermal contact between the optical tip 150 and the outer sheath 152 can be varied angularly around the longitudinal direction of the tip, in order to provide a circumferential variation in temperature, as may be desired Particularly suitable materials from which the outer sheath 152 can be formed are molybdenum and nickel.

Figure 19:
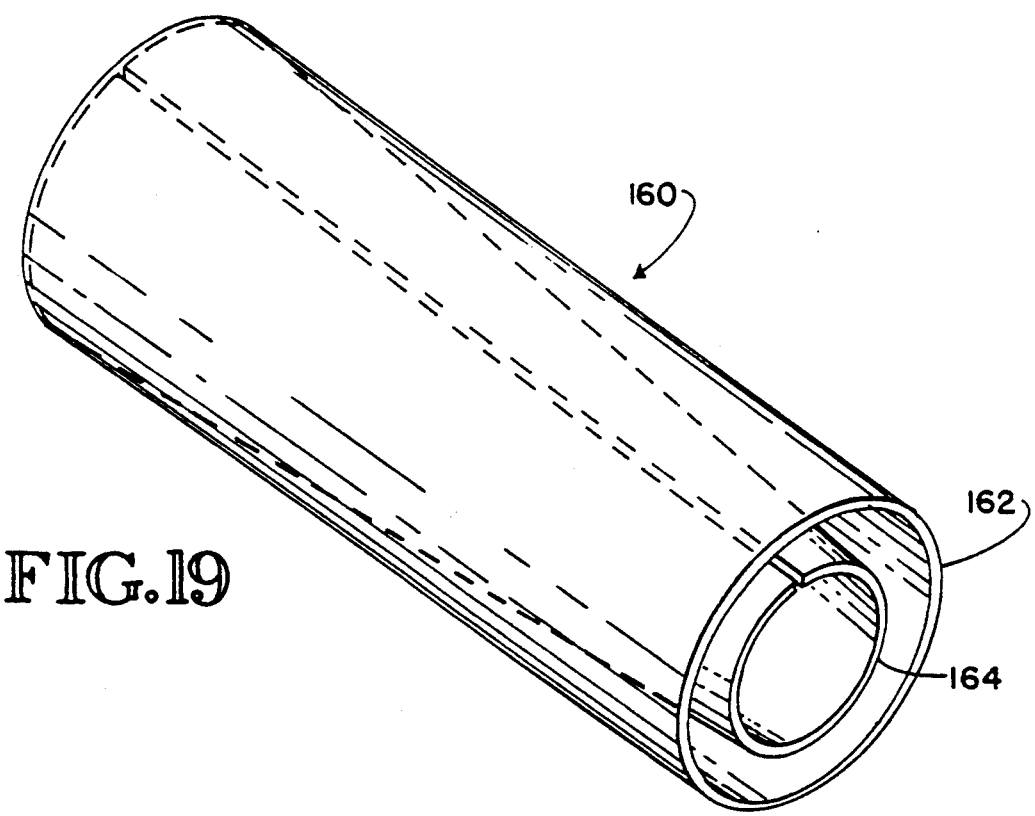
FIG. 19 is an isometric view showing an eighth embodiment of the optical conduit tip of the present invention.

FIG. 19 is an isometric view of an optical conduit tip 160 according to an eighth embodiment of the present invention. The optical tip 160 shown in FIG. 19 has an outer sheath 164 and an inner tip portion 164. The inner tip portion 164 can be any desired optical conduit tip, for example one of the conically shaped tips shown in FIGS. 15-17. The outer sheath portion 162 can have a cylindrical or other desired shape and serves as a protective sheath for the inner tip portion 162 while at least assisting in maintaining the shape of the tip. The outer sheath 162 also serves as a thermal sink for the thermal energy which is generated at the optical tip 160, which tends to prolong the life of the tip. As described above in connection with the embodiment shown in FIG. 18, the optical tip 160 and the outer sheath 164 can be configured for a specific application by changing the location, orientation, and length of the thermal contact (at the proximal end) between the optical tip 160 and the outer sheath 164. Further, a desired temperature profile and heat transfer rate can be obtained by choosing appropriate materials for the optical tip 160 and the outer sheath 164.

While the invention has been discussed in terms of specific embodiments, one skilled in the art will readily appreciate that various modifications of the above-described embodiments may be made without departing from the spirit and the scope of the invention. Accordingly, the present invention is to be limited only by the following claims.

We claim:

1. A hollow tip for transmission of light energy from the end of a light conduit to an area exterior of the light conduit, comprising:
an elongated tip housing having an interior surface defining an elongated interior space through which the light energy is transmitted from an input end through an output end to the area exterior of the light conduit, said elongated tip housing being adapted to be selectively attached to the end of the light conduit, a first portion of said interior surface reflecting the light energy incident thereon from the light conduit at an incidence angle that is less than 90 degrees and being composed of a material having a complex index of refractivity with a real part (n) less than about 0.4.

2. The tip of claim 1 wherein the interior surface of said elongated tip housing is made from a material chosen from the group of materials consisting of silver, gold, and copper.

3. The tip of claim 1 wherein said tip housing is made from a material chosen from the group of materials consisting of copper, molybdenum, and nickel.

4. The tip of claim 1 wherein said tip housing tapers form said input end to said output end.

5. The tip of claim 1 wherein said reflective layer is overcoated with a dielectric layer.

6. The tip of claim 5 wherein the light energy includes energy having a predetermined wavelength and said dielectric layer is approximately equal to one-eighth of said predetermined wavelength.

7. The tip of claim 5 wherein said dielectric layer is sufficiently thick to enhance the reflectivity of said reflective layer.

8. The tip of claim 1 for use in laser surgery of tissue wherein the tip is in contact with said tissue and the tip concentrates the light energy at said output end to concentrate the intensity of the power of the light energy.

9. The tip of claim 8 wherein a second portion of the interior surface of the tip also absorbs some of the light energy and heats up the tip to achieve coagulation of the tissue.

10. A hollow tip for transmission of light energy from the end of a light conduit to an area exterior of the light conduit, comprising:
an elongated tip housing having an interior surface defining an elongated interior space through which the light energy is transmitted from an input end through an output end to the area exterior of the light conduit, said input end and said output end being separated by a predetermined length, and said elongated tip housing being adapted to be attached to the end of the light conduit;
a reflective layer formed on said interior surface of said tip housing for reflecting the light energy incident thereon from the light conduit at an incidence angle that is less than 90 degrees, said layer being composed of a material having a complex index of refractivity with a real part (n) less than about 0.4; and
a sleeve surrounding said tip housing along said predetermined length.

11. The tip of claim 10 wherein said tip housing tapers from said input end to said output end.

12. The tip of claim 11 wherein said sleeve tapers from said input end to said output end and maintains thermal contact with said tip housing along a predetermined portion of said predetermined length.

13. The tip of claim 12 wherein said sleeve is made from a material which conducts thermal energy from said tip housing to control the temperature of said tip housing.

14. The tip of claim 10 wherein said sleeve maintains contact with said tip housing along substantially the full length of said predetermined length.

15. The tip of claim 10 wherein said sleeve has a first portion in contact with said tip housing and a second lengthwise portion spaced away from said tip housing.

16. The tip of claim 10 wherein said sleeve is made from a material which conducts thermal energy from said tip housing to control the temperature of said tip housing.

17. A method of manufacturing a hollow tip for transmission of light energy from the end of a light conduit to an area exterior of the light conduit, comprising the steps of:
  (a) forming an elongated tip housing having an interior surface defining an elongated interior space between an input end and an output end;
  (b) forming a reflective layer on said interior surface of said tip housing for reflecting the light energy incident thereon from the light conduit at an incidence angle that is less than 90 degrees, said layer being composed of a material having a complex index of refractivity with a real part (n) less than about 0.4; and
  (c) adapting said elongated tip housing to be attached to the end of the light conduit.

18. The method of claim 17 wherein step (a) comprises forming a generally cylindrical tip housing and shaping said cylindrical tip housing to provide said interior surface.

19. The method of claim 18 wherein said cylindrical tip housing is shaped by being placed between two dies having predetermined shapes and forcing said two dies toward each other to shape said cylindrical tip housing to provide said interior surface.

20. The method of claim 19 further comprising the step of forming a pair of projecting planar extensions extending outwardly from said elongated tip housing.

21. The method of claim 17 wherein said predetermined planar sheet is a strip and step (b) comprises spirally wrapping said planar shape.

22. A method of manufacturing a hollow tip for transmission of light energy from the end of a light conduit to an area exterior of the light conduit, comprising the steps of:
  (a) forming a predetermined planar sheet from a substrate material, said planar sheet having a first side and a second side;
  (b) bending said predetermined planar sheet to form an elongated tip housing, said first side defining a predetermined interior surface of said elongated tip housing;
  (c) forming a reflective layer on said first side, said layer being composed of a material having a complex index of refractivity with a real part (n) less than about 0.4 and reflecting the light energy incident thereon from the light conduit at an incidence angle that is less than 90 degrees; and
  (d) adapting said elongated tip housing to be attached to the end of a light conduit.

23. The method of claim 22 wherein step (b) comprises attaching said two circumferential sheet edge portions and two adjoining radial sheet edges portions.

24. The method of claim 23 wherein step (b) comprises bending said predetermined planar sheet into a frustoconical shape having two circumferential sheet edge portions and two adjoining radial sheet edge portions.

25. The method of claim 24 wherein said two adjoining radial sheet edge portions are abutting to form a butt joint.

26. The method of claim 24 wherein said two adjoining radial sheet edge portions are overlapping to form a lap joint.

27. A method of manufacturing a hollow tip for transmission of light energy from the end of a light conduit to an area exterior of the light conduit, comprising the steps of:
  (a) forming two predetermined planar sheets from a substrate material, said planar sheets each having a first side and a second side;
  (b) bending said predetermined planar sheets to form substantially identical tip half housings, said tip half housings each having a pair of perimeter edges, said tip half housings defining in combination a frustoconical housing when corresponding perimeter edges of said tip half housings are positioned together, said tip half housings each having a pair of projecting planar extensions extending outward from said perimeter edges thereof;
  (c) placing said tip half housings together with said first sides thereof facing toward each other and said corresponding perimeter edges of said tip half housings together to define an elongated housing;
  (d) connecting said two tip half housings together;
  (e) forming a reflective layer on at least a portion of said first surfaces of said two tip half housings, said layer being composed of a material having a complex index of refractivity with a real part (n) less than about 0.4 and reflecting the light energy incident thereon from the light conduit at an incidence angle that is less than 90 degrees; and
  (f) adapting said elongated tip housing to be attached to the end of the light conduit.

28. The method of claim 27 further comprising the steps of:
  (g) providing a longitudinal sleeve; and
  (h) after placing said tip half housings together, positioning said tip half housings in said longitudinal sleeve with an inside surface of said longitudinal sleeve engaging said second side of said tip half housings to hold said first and second tip half housings together.

29. The method of claim 28 further comprising the step of:
  (i) after placing said tip half housings together, positioning said tip half housings so that substantially all of said inside surface of said longitudinal sleeve is in contact with said second side of said tip half housings.

30. A hollow tip for transmission of light energy from the end of a light conduit to an area exterior of the light conduit, comprising:
  an elongated tip housing having an elongated interior space through which the light energy is transmitted from an input end through an output end to the area exterior of the light conduit, said elongated tip housing being adapted to be attached to the end of the light conduit, said elongated tip housing having a reflective layer formed on said interior surface for reflecting the light energy incident thereon from the light conduit at an incidence angle that is less than 90 degrees, said interior surface being composed of a material having a complex index refractivity with a real part (n) less than about 0.4.

31. A hollow tip for transmission of light energy from the end of a light conduit to an area exterior of the light conduit, comprising:

an elongated tip housing having an interior surface defining an elongated interior space through which the light energy is transmitted from an input end through an output end to the area exterior of the light conduit, said input end and said output end being separated by a predetermined length, and said elongated tip housing being adapted to be attached to the end of the light conduit; and a reflective layer formed on said interior surface of said tip housing for reflecting the light energy incident thereon from the light conduit at an incidence angle that is less than 90 degrees, said layer being composed of a material having a complex index of refractivity with a real part (n) less than about 0.4.

32. The tip of claim 31 wherein said tip housing tapers from said input end to said output end.

33. The tip of claim 32 wherein said sleeve tapers from said input end to said output end and maintains thermal contact with said tip housing along a predetermined portion of said predetermined length.

34. The tip of claim 33 wherein said sleeve is made from a material which conducts thermal energy from said tip housing to control the temperature of said tip housing.

35. The tip of claim 31 wherein said sleeve maintains contact with said tip housing along substantially the full length of said predetermined length.

36. The tip of claim 31 wherein said sleeve has a first portion in contact with said tip housing and a second lengthwise portion spaced away from said tip housing.

* * * * *